US007467118B2

(12) United States Patent
    Lanckriet

(10) Patent No.: US 7,467,118 B2
(45) Date of Patent: Dec. 16, 2008

(54) ADJUSTED SPARSE LINEAR PROGRAMMING METHOD FOR CLASSIFYING MULTI-DIMENSIONAL BIOLOGICAL DATA

(75) Inventor: Gert R. G. Lanckriet, San Diego, CA (US)

(73) Assignee: Entelos Inc., Foster City, CA (US)

( * ) Notice: Subject to any disclaimer, the term of this patent is extended or adjusted under 35 U.S.C. 154(b) by 0 days.

(21) Appl. No.: 11/332,718

(22) Filed: Jan. 12, 2006

(65) Prior Publication Data

US 2007/0162406 A1    Jul. 12, 2007

(51) Int. Cl.
    G06F 15/18    (2006.01)
    G06K 9/62    (2006.01)
(52) U.S. Cl. .................................. 706/20; 382/224
(58) Field of Classification Search .................. 706/20; 382/224
    See application file for complete search history.

(56) References Cited

U.S. PATENT DOCUMENTS

| 5,930,154 | A | 7/1999 | Thalhammer-Reyero |
| 6,157,921 | A | 12/2000 | Barnhill |
| 6,291,182 | B1 | 9/2001 | Schork et al. |
| 6,427,141 | B1 | 7/2002 | Barnhill |
| 6,647,341 | B1 | 11/2003 | Golub |
| 6,658,395 | B1 | 12/2003 | Barnhill |
| 6,882,990 | B1 | 4/2005 | Barnhill |
| 7,054,755 | B2 | 5/2006 | O'Reilly |
| 2003/0093393 | A1* | 5/2003 | Mangasarian et al. ......... 706/16 |
| 2003/0180808 | A1 | 9/2003 | Natsoulis |
| 2004/0259764 | A1 | 12/2004 | Tugendreich |
| 2005/0060102 | A1 | 3/2005 | O'Reilly |

FOREIGN PATENT DOCUMENTS

| EP | 0935210 A2 | 8/1999 |
| WO | WO 96/23078 | 8/1996 |
| WO | WO 99/58720 | 11/1999 |
| WO | WO 00/50889 | 8/2000 |
| WO | WO 00/65421 | 11/2000 |
| WO | WO 02/10453 | 2/2002 |
| WO | WO 02/25570 | 3/2002 |
| WO | WO 2005/017807 | 2/2005 |

OTHER PUBLICATIONS

Golub et al., Molecular Classification of Cancer: Class Discovery and Class Prediction by Gene Expression Monitoring, 1999.*

(Continued)

*Primary Examiner*—David R. Vincent
*Assistant Examiner*—Nathan H Brown, Jr.
(74) *Attorney, Agent, or Firm*—Howrey LLP; Adam K. Whiting

(57) ABSTRACT

The invention relates to improved methods and computer-based systems and software products useful for deriving and optimizing linear classifiers based on an adjusted sparse linear programming methodology (A-SPLP). This methodology is based on minimizing an objective function, wherein the objective function includes a loss term representing the performance of the objective function on a training dataset comprising at least two separate, adjustable weighting constants associated with classification errors for data points in-class and not-in-class, respectively.

34 Claims, 2 Drawing Sheets

OTHER PUBLICATIONS

Wolfinger et al., Assessing Gene Significance from cDNA Microarray Expression Data via Mixed Models, 2001.*

Rifkin, In Defense of One-Vs-All Classification, 2004.*

Bredensteiner, "Multicategory Classification by Support Vector Machines", 1999.*

EP 01981547 : Search Report, Oct. 29, 2004.

Sorace J et al., "Functional Bioinformatics: The Cellular Response Database", *Frontiers in Bioscience*, vol. 2, (1997), pp. 31-36.

Weinstein J et al., "An Information-Intensive Approach to the Molecular Pharmacology of Cancer", *Science*, vol. 275, (1997), pp. 343-349.

Kim S et al., "Strong Feature Sets from Small Samples", *Journal of Computational Biology*, vol. 9, (2002), pp. 127-146.

Bhattacharyya C et al., "Simultaneous Classification and Relevant Feature Identification in High-Dimensional Spaces : Application to Molecular Profiling Data", *Signal Processing*, vol. 83, (2003), pp. 729-743.

Goldfarb D et al., "Robust Convex Quadratically Constrained Programs", *Mathematical Programming*, vol. 97, (2003), pp. 495-515.

Natsoulis et al., "Classification of a large microarray data set: Algorithm comparison and analysis of drug signatures," Genome Research 15:724-736 (May 2005).

Ei Ghaoui, et al., "Robust classifiers with interval data" Report # UCB/CSD-03-1279, Computer Science Division (EECS), University of California, Berkeley, California (2003).

Brown et al., "Knowledge-based analysis of microarray gene expression data by using support vector machines," Proc Natl Acad Sci U S A 97: 262-267 (2000).

Ganter et al., "Development of a large-scale chemogenomics database to improve drug candidate selection and to understand mechanisms of chemical toxicity and action," J Biotechnol. 29;119(3):219-44 (Sep. 2005).

* cited by examiner

ADJUSTED SPARSE LINEAR PROGRAMMING METHOD FOR CLASSIFYING MULTI-DIMENSIONAL BIOLOGICAL DATA

FIELD OF THE INVENTION

The invention relates to an improved method for deriving a linear classifier for a dataset based on an adjusted sparse linear programming (A-SPLP) algorithm.

BACKGROUND OF THE INVENTION

Complete genomic sequence information is now available for a wide range of organisms. Consequently, the specific function of these organism's genes can be studied using a variety of information dense, high-throughput genomic analysis methods, for example, polynucleotide arrays. These arrays provide vast amounts of gene expression data corresponding to the differential abundance of specific mRNA transcripts in related biological samples. For example, transcript abundance may be compared in tissue samples from in vivo compound-treated animals as described in US application 2005/0060102 A1, published Mar. 17, 2005.

Gene expression data obtained using polynucleotide arrays are often associated with multiple dimensions. In some instances, the number of dimensions can correspond to the number of genes for which measurements are made, a number which is often in the thousands. In analyzing these vast amounts of multi-dimensional data, techniques are desirable for analysis and interpretation of the data. In particular, it is desirable to develop techniques to classify and identify relationships in multidimensional biological data. Various techniques for analyzing multi-dimensional biological data have been described. For example, WO 03/072065 describes methods for deriving signatures from large chemogenomic datasets using principal component analysis. Natsoulis et al. describe several methodologies for deriving linear classifiers from large chemogenomic datasets wherein the classifiers provide interpretable drug signatures with high classification performance (Natsoulis et al., Genome Res. May; 15 (5):724-36 (2005); see also: WO 2005/017807; and El-Ghaoui et al., Report # UCB/CSD-03-1279. *Computer Science Division (EECS)*, University of California, Berkeley, Calif. (2003)). Bhattacharyya et al. describe a statistical approach for generating a linear classifier from expression profile data and identifying a small number of relevant features simultaneously (Bhattacharyya et al., *Signal Processing* 83: 729-743 (2003); see also, Bhattacharyya et al., J Comput Biol. 11 (6):1073-89 (2004)). U.S. Pat. No. 6,882,990 describes methods and systems for identifying patterns in biological datasets using multiple support vector machines.

Key to the usefulness of any biological classifier is its ability to prevent or minimize any false positive or false negative results. However, because biological datasets used to derive and train classifiers are typically highly unbalanced (i.e., including many true negatives and just a few true positive samples) the standard classification techniques often result in classifiers with low accuracy when confronted with actual test data. Notwithstanding the prior described methods, there remains a significant need for robust yet simple classifiers that accurately predict a biological activity or a biological state (e.g., a disease diagnosis) based on non-ideal biological data.

SUMMARY OF THE INVENTION

The present invention provides improved methods and systems for deriving and optimizing linear classifiers based on an adjusted sparse linear programming methodology (A-SPLP). This methodology is based on minimizing an objective function, wherein the objective function includes a loss term representing the performance of the objective function on a training dataset and which comprises at least two separate, adjustable weighting constants: one weighting constant modifies the classification errors for data points in-class, and the other weighting constant modifies the classification errors for data points not-in-class.

In one embodiment, the present invention provides a method for deriving a linear classifier, wherein the method comprises: (a) providing a training dataset comprising two subsets of data points, wherein one subset of data points is labeled in-class and the other subset of data points is labeled not-in-class; (b) providing an objective function, wherein said objective function comprises a 1-norm regularization term and a loss term, wherein said loss term comprises: (i) a classification error for each data point labeled in the class and a weighting constant for the total in-class classification error; and (ii) a classification error for each data point labeled not in the class and a weighting constant for the total not-in-class classification error; and (c) minimizing said objective function for the training dataset; whereby said minimized objective function provides a linear classifier. In one embodiment, the method provides the values w and b of a linear classifier of the form $w^T \cdot x_i + b$.

In one embodiment of the present invention, this method is carried out wherein the loss term of the objective function has the formula:

$$L_{A\text{-}SPLP} = C_+ \Sigma_{i \in x_+} \xi_i + C_- \Sigma_{i \in x_-} \xi_i,$$

wherein, $\Sigma_{i \in x_+} \xi_i$ is the classification error for data points labeled in-class and $C_+$ is the total in-class weighting constant, and $\Sigma_{i \in x_-} \xi_i$ is the classification error for data points labeled not-in-class and $C_-$ is the total not-in-class weighting constant.

In one embodiment of the present invention, this method is carried out wherein the loss term of the objective function has the formula:

$$L_{A\text{-}SPLP} = C_+ \Sigma_{i \in x_+} (\log(1 + \exp(w^T \cdot x_i + b)) - y_i(w^T \cdot x_i + b))$$

$$+ C_- \Sigma_{i \in x_-} (\log(1 + \exp(w^T \cdot x_i + b)) - y_i(w^T \cdot x_i + b))$$

wherein, $$\Sigma_{i \in x_+} (\log(1 + \exp(w^T \cdot x_i + b)) - y_i(w^T \cdot x_i + b))$$

is the error for data points labeled in-class and $C_+$ is the total in-class weighting constant, and $$\Sigma_{i \in x_-} (\log(1 + \exp(w^T \cdot x_i + b)) - y_i(w^T \cdot x_i + b))$$

is the error for data points labeled not-in-class and $C_-$ is the total not-in-class weighting constant.

In one embodiment, the method is carried out wherein the 1-norm regularization term of the objective function has the formula:

$$\sum_{j=1}^{m} \sigma_j |w_j|$$

wherein $\sigma_j$ is the j-th component of a vector $\sigma$ with n components and $|w_j|$ is the absolute value of the j-th component $w_j$ of the weight vector w with n components.

In one embodiment of the present invention, this method is carried out wherein minimizing said objective function is performed according to the formulation:

$$\min_{w,b,\xi} \sum_{j=1}^{m} \sigma_j |w_j| + C_+ \sum_{i \in x_+} \xi_i + C_- \sum_{i \in x_-} \xi_i \text{ subject to}$$

$$y_i(w^T \cdot x_i + b) \geq 1 - \xi_i, \quad i = 1, \ldots, n$$

$$\xi_i \geq 0, \quad i = 1, \ldots, n.$$

In one embodiment of the present invention, this method is carried out wherein the training dataset comprises fewer data points labeled in-class than data points labeled not-in-class, and in some embodiment, the number of data points labeled in-class is less than about 25%, about 20%, about 15%, about 10%, or even about 5% or fewer of the number of data points labeled not-in-class.

In one embodiment of the present invention, this method is carried out wherein in-class represents a class selected from the group consisting of: a biological state; a biological state resulting from a compound treatment; or a structural class of compounds.

The present invention also provides software products encoded in a computer readable medium and computer systems for carrying out the above methods for deriving a linear classifier. In one embodiment, the invention provides a computer-readable medium having encoded thereon computer-executable code for deriving a linear classifier, said code comprising instructions for: (1) accepting input of a training dataset, wherein the training dataset comprises two subsets of data points labeled in-class and not-in-class; (2) minimizing an objective function on the training data set, wherein said objective function comprises a 1-norm regularization term and a loss term, wherein the loss term comprises, (i) a classification error for each data point labeled in the class and a weighting constant for the total in-class classification error, and (ii) a classification error for each data point labeled not in the class and a weighting constant for the total not-in-class classification error; (3) minimizing said objective function for the training set, whereby said minimized objective function provides a linear classifier. In one embodiment, minimizing the objective function provides the values w and b of a linear classifier of the form $w^T \cdot x_i + b$.

In one embodiment, the computer-readable medium has encoded thereon computer-executable code, wherein said objective function comprises a loss term of the formula:

$$L_{A\text{-}SPLP} = C_+ \Sigma_{i \in x_+} \xi_i + C_- \Sigma_{i \in x_-} \xi_i,$$

wherein, $\Sigma_{i \in x_+} \xi_i$ is the classification error for data points labeled in-class and $C_+$ is the total in-class weighting constant, and $\Sigma_{i \in x_-} \xi_i$ is the classification error for data points labeled not-in-class and $C_-$ is the total not-in-class weighting constant.

In one embodiment, the computer-readable medium has encoded thereon computer-executable code, wherein said objective function comprises a loss term of the formula:

$$L_{A\text{-}SPLP} = C_+ \Sigma_{i \in x_+} (\log(1 + \exp(w^T \cdot x_i + b)) - y_i(w^T \cdot x_i + b))$$

$$+ C_- \Sigma_{i \in x_-} (\log(1 + \exp(w^T \cdot x_i + b)) - y_i(w^T \cdot x_i + b))$$

wherein, $$\Sigma_{i \in x_+} (\log(1 + \exp(w^T \cdot x_i + b)) - y_i(w^T \cdot x_i + b))$$

is the error for data points labeled in-class and $C_+$ is the total in-class weighting constant, and $$\Sigma_{i \in x_-} (\log(1 + \exp(w^T \cdot x_i + b)) - y_i(w^T \cdot x_i + b))$$

is the error for data points labeled not-in-class and $C_-$ is the total not-in-class weighting constant.

In one embodiment, the computer-readable medium has encoded thereon computer-executable code, wherein said 1-norm regularization term has the formula:

$$\sum_{j=1}^{m} \sigma_j |w_j|$$

wherein, $\sigma_j$ is the j-th component of a vector $\sigma$ with n components and $|w_j|$ is the absolute value of the j-th component $w_j$ of the weight vector w with n components.

In one embodiment, the computer-readable medium has encoded thereon computer-executable code comprising instructions for minimizing said objective function according to the formulation:

$$\min_{w,b,\xi} \sum_{j=1}^{m} \sigma_j |w_j| + C_+ \sum_{i \in x_+} \xi_i + C_- \sum_{i \in x_-} \xi_i \text{ subject to}$$

$$y_i(w^T \cdot x_i + b) \geq 1 - \xi_i, \quad i = 1, \ldots, n$$

$$\xi_i \geq 0, \quad i = 1, \ldots, n.$$

In one embodiment of the present invention, the input training dataset comprises fewer data points labeled in-class than data points labeled not-in-class, and in some embodiment, the number of data points labeled in-class is less than about 25%, about 20%, about 15%, about 10%, or even about 5% or fewer of the number of data points labeled not-in-class. In one embodiment of the present invention, the in-class data points represent a class selected from the group consisting of: a biological state; a biological state resulting from a compound treatment; or a structural class of compounds.

In one embodiment, the present invention also provides a computer system comprising a computer-readable medium having encoded thereon a chemogenomic database and the above-described computer-executable code for deriving a linear classifier.

The present invention also provides a method for optimizing a linear classifier derived using a training dataset by adjusting the error weights and optimizing a performance score on a test dataset. With reference to flow chart depictions of FIGS. 1 and 2, the method for optimizing a linear classifier comprises: (a) providing a dataset comprising two subsets of data points (109), wherein one subset of data points is labeled in-class and the other subset of data points is labeled not-in-class; (b) randomly dividing the dataset into a plurality of splits, wherein each split comprises a training dataset (202) and a test dataset (203); (c) deriving a linear classifier by minimizing an objective function on a training dataset, wherein said objective function comprises a 1-norm regularization term and a loss term, wherein said loss term comprises: (i) a classification error for each data point labeled in the class and a weighting constant for the total in-class classification error; and (ii) a classification error for each data point labeled not in the class and a weighting constant for the total not-in-class classification error; (d) adjusting at least one of the weighting constants (108), thereby generating an adjusted objective function; (e) minimizing the adjusted objective function on the training dataset of each of the plurality of splits (202), thereby generating a plurality of adjusted linear classifiers (204); (f) for each of the plurality of linear classifiers, determining a true positive rate, TP (206), and a true negative rate, TN (206), for classifying the corresponding test dataset of the split (205); (g) determining the LE score (106), wherein LE score is defined as:

$$LE=-\log(\exp(TP_{goal}-TP_{avg})+\exp(TN_{goal}-TN_{avg})),$$

wherein $TP_{goal}$ is a goal true positive rate, $TP_{avg}$ (207) is the average true positive rate for the plurality of adjusted linear classifiers, $TN_{goal}$ is a goal true negative rate and $TN_{avg}$ (207) is the average true negative rate for the plurality of adjusted linear classifiers; (h) repeating steps (d)-(g) until the LE score can no longer be improved (107); (i) minimizing the objective function (110) on the full dataset (109), with the weighting constants set to the values that resulted in the best LE score in step (g), thereby generating an optimized linear classifier (111).

In one embodiment of the invention the method for optimizing a classifier is carried out wherein adjusting the weighting constants is performed using a "hill-climbing" method (101) comprising: (a) providing upper and lower boundary values (103) for each of the in-class weighting constant, not-in-class weighting constant, and the ratio of the weighting constants; (b) providing a logarithmic-scale grid (102), wherein each grid point represents a possible combination of in-class and not-in-class weighting constants; (c) selecting a grid point (104); (d) determining the LE score of the grid point (105); (e) inspecting the grid point, wherein inspecting comprises evaluating the eight direct neighbor grid points (105), wherein evaluating comprises determining the LE score (106); (f) selecting the next grid point as the grid point with the best LE score amongst all grid points that have not yet been inspected but have been evaluated, wherein the best LE score is the highest score not more than a set threshold amount lower than the current best LE score in the grid, and in the case of a tie between grid points, selecting the point nearest to the point with the current best LE score in the grid (107); (g) repeating steps (e)-(f) until no next grid point is found with an LE score not more than the set threshold amount lower than the current best LE score in the grid.

In one embodiment of the present invention, this method for optimizing a classifier is carried out wherein the training dataset comprises fewer data points labeled in-class than data points labeled not-in-class, and in some embodiment, the number of data points labeled in-class is less than about 25%, about 20%, about 15%, about 10%, or even about 5% or fewer of the number of data points labeled not-in-class.

In one embodiment of the present invention, this method for optimizing a classifier is carried out wherein in-class represents a class selected from the group consisting of: a biological state; a biological state resulting from a compound treatment; or a structural class of compounds.

The present invention also provides computer-based embodiments of the methods for optimizing a linear classifier described above. In one embodiment, the computer-readable medium has encoded thereon computer-executable code for comprising instructions for: (a) accepting input of a dataset comprising two subsets of data points, wherein one subset of data points is labeled in-class and the other subset of data points is labeled not-in-class; (b) randomly dividing the dataset into a plurality of splits, wherein each split comprises a training dataset and a test dataset; (c) deriving a linear classifier by minimizing an objective function on a training dataset, wherein said objective function comprises a 1-norm regularization term and a loss term, wherein said loss term comprises: (i) a classification error for each data point labeled in the class and a weighting constant for the total in-class classification error; and (ii) a classification error for each data point labeled not in the class and a weighting constant for the total not-in-class classification error; (d) adjusting at least one of the weighting constants, thereby generating an adjusted objective function; (e) minimizing the adjusted objective function on the training dataset of each of the plurality of splits, thereby generating a plurality of adjusted linear classifiers; (f) for each of the plurality of linear classifiers, determining a true positive rate, TP, and a true negative rate, TN, for classifying the corresponding test dataset of the split; (g) determining the LE score, wherein LE score is defined as:

$$LE=-\log(\exp(TP_{goal}-TP_{avg})+\exp(TN_{goal}-TN_{avg})),$$

wherein $TP_{goal}$ is a goal true positive rate, $TP_{avg}$ is the average true positive rate for the plurality of adjusted linear classifiers, $TN_{goal}$ is a goal true negative rate and $TN_{avg}$ is the average true negative rate for the plurality of adjusted linear classifiers; (h) repeating steps (d)-(g) until the LE score can no longer be improved; (i) minimizing the objective function on the dataset, with the weighting constants set to the values that resulted in the best LE score in step (g), thereby generating an optimized linear classifier.

In one embodiment, the computer-readable medium has encoded thereon computer-executable code, wherein adjusting the weighting constants comprises instructions for: (a) providing upper and lower boundary values for the in-class weighting constant, not-in-class weighting constant, and the ratio of the weighting constants; (b) providing a logarithmic-scale grid, wherein each grid point represents a possible combination of in-class and not-in-class weighting constants; (c) selecting a grid point; (d) determining the LE score of the grid point; (e) inspecting the grid point, wherein inspecting comprises evaluating the eight direct neighbor grid points, wherein evaluating comprises determining the LE score; (f) selecting the next grid point as the grid point with the best LE score amongst all grid points that have not yet been inspected but have been evaluated, wherein the best LE score is the highest score not more than a set threshold amount lower than the current best LE score in the grid, and in the case of a tie between grid points, selecting the point nearest to the point with the current best LE score in the grid; (g) repeating steps (e)-(f) until no next grid point is found with an LE score not more than the set threshold amount lower than the current best LE score in the grid.

In one embodiment, the present invention also provides a computer system comprising a computer-readable medium having encoded thereon a chemogenomic database and the above-described computer-executable code for optimizing a linear classifier.

DETAILED DESCRIPTION OF THE INVENTION

I. Overview

Figure 1:
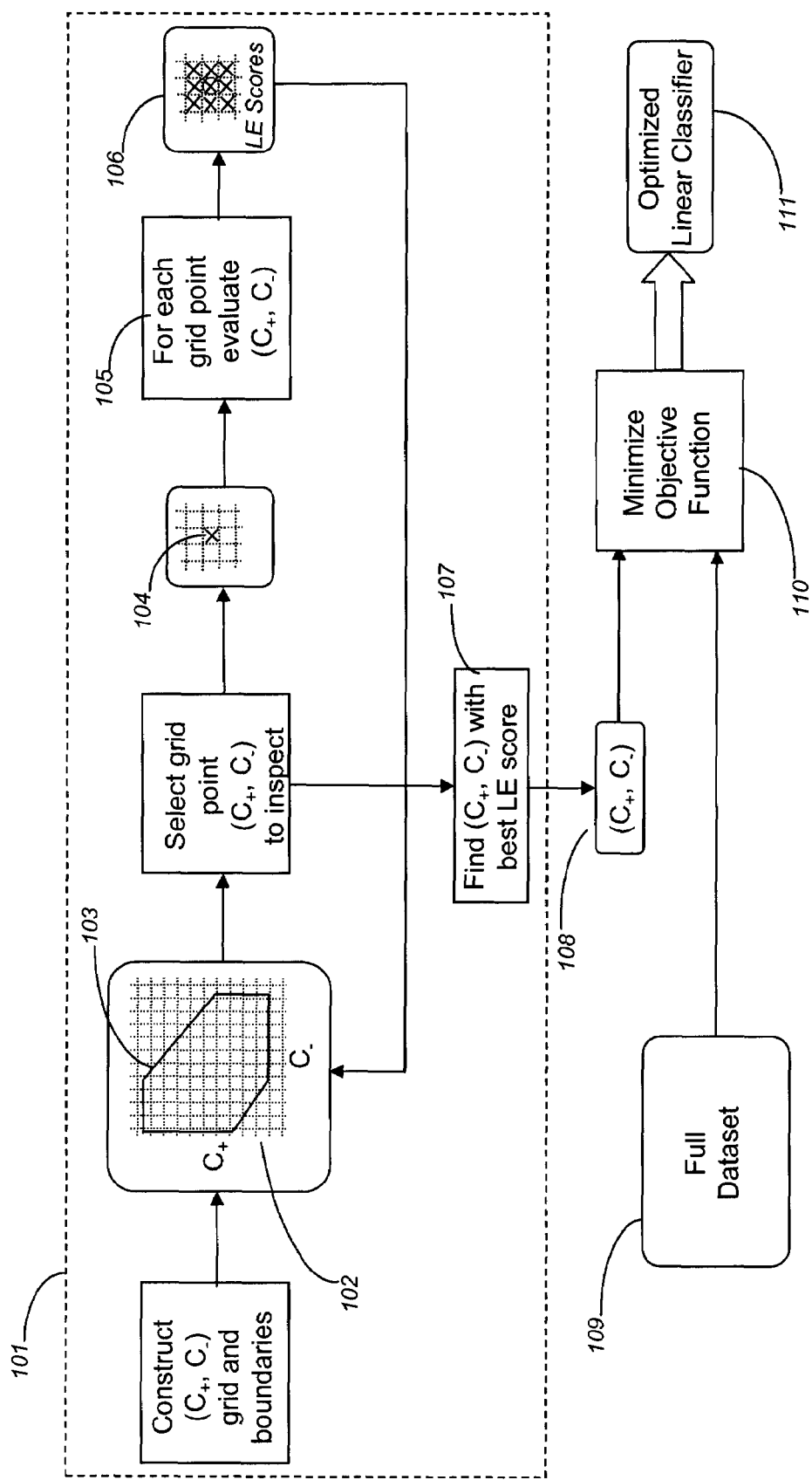
FIG. 1 is a flow chart depicting the modified "hill-climbing" algorithm (101) used to generated adjusted loss function parameters $C_+$ and $C_-$ (108) in the method for generating an optimized linear classifier (111).

The present invention provides a method for deriving linear classifiers from training datasets and optimizing the classifiers on test data. The methodology provides linear classifiers that are sparse (i.e., require relatively few measured variables) yet capable of high performance in terms of low classification error rates, including high specificity and sensitivity. The A-SPLP methodology disclosed herein provides particular advantages for classification of highly asymmetric datasets, i.e., wherein the number of data points labeled in-class is about 25% or less the number of data points labeled not-in-class. Independent adjustment of the in-class and not-in-class classification error weighting constants provides linear classifiers with greater sparsity and higher performance on test data. Specifically, classifiers derived using the A-SPLP methodology may have substantially fewer variables (e.g., a much shorter list of genes) and exhibit significantly higher sensitivity (corresponding to increased rate of True Positive classifications), with little loss of specificity (corresponding to rate of True Negative classifications).

II. Definitions

The following definitions apply to some of the elements described with regard to some embodiments of the invention. These definitions may likewise be expanded upon herein.

"Multivariate dataset," "dataset" or "data set" as used herein, refers to any set of measurements or data points comprising a plurality of different variables, including but not limited to data collected from chemogenomic compound treatment experiments comprising log ratios from differential gene expression experiments, such as those carried out on polynucleotide microarrays, or multiple protein binding affinities measured using a protein chip. Other examples of datasets include assemblies of data from a plurality of standard toxicological or pharmacological assays (e.g., blood analytes measured using enzymatic assays, antibody based ELISA or other detection techniques).

"Variable" as used herein, refers to any value that may vary. For example, variables may include relative or absolute amounts of biological molecules, such as mRNA or proteins, or other biological metabolites. Variables may also include dosing amounts of test compounds.

"Signature," "drug signature," "classifier" or "linear classifier" as used herein, refers to a linear function comprising a combination of variables, weighting factors, and other constants that provides a unique value or function capable of answering a classification question and whose cross-validated performance for answering a specific classification question is greater than an arbitrary threshold (e.g., a log odds ratio $\geq 4.0$). The "classification question" may be of any type susceptible to yielding a yes or no answer—e.g., "Is the unknown a member of the class (i.e., in-class) or does it belong with everything else outside the class (i.e., not-in-class)?". "Linear classifier" refers to a classifier comprising a first order function of a set of variables, for example, a summation of a weighted set of gene expression log ratios. A valid classifier is defined as a classifier capable of achieving a performance for its classification task at or above a selected threshold value. For example, a log odds ratio $\geq 4.00$ represents a preferred threshold of the present invention. Higher or lower threshold values may be selected depending of the specific classification task.

A "training dataset" as used herein refers to any dataset that may be used to train a linear classifier to classify data in-class from not-in-class. The process of "training" a linear classifier is also referred to herein as "deriving" a linear classifier from a dataset.

A "test dataset" as used herein refers to a dataset used to measure the performance of linear classifier (i.e., "testing" the classifier). Typically, the test dataset does not include any of the data points from the training set used to train the linear classifier and thereby provides an independent measure of the classifier's performance.

A "split" of a dataset as used herein refers to a partition or subset of a full dataset. Typically, a full dataset may be divided or partitioned into a plurality of "test" and "training" splits based on a set percentage (e.g., a 60%:40% training/test split).

An "objective function" as used herein refers to any function that is the object of a minimization and/or optimization procedure.

"Weighting constant," "weighting factor" or "weight" as used herein, refers to a value used by an algorithm in combination with a variable in order to adjust the contribution of the variable.

"Impact factor" or "Impact" as used herein in the context of classifiers or signatures refers to the product of the weighting factor by the average value of the variable of interest. For example, where gene expression log ratios are the variables, the product of the gene's weighting factor and the gene's measured expression $\log_{10}$ ratio yields the gene's impact. The sum of the impacts of all of the variables (e.g., genes) in a set yields the "total impact" for that set.

"Scalar product" (or "Signature score") as used herein refers to the sum of impacts for all genes in a signature less the bias for that signature. A positive scalar product for a sample indicates that it is positive for (i.e., a member of) the classification that is determined by the classifier or signature.

"Log odds ratio" or "LOR" is used herein to summarize the performance of classifiers or signatures. LOR is defined generally as the natural log of the ratio of the odds of predicting a subject to be positive when it is positive, versus the odds of predicting a subject to be positive when it is negative. LOR is estimated herein using a set of training or test cross-validation partitions according to the following equation, $$LOR = \ln \frac{\left(\sum_{i=1}^{c} TP_i + 0.5\right) * \left(\sum_{i=1}^{c} TN_i + 0.5\right)}{\left(\sum_{i=1}^{c} FP_i + 0.5\right) * \left(\sum_{i=1}^{c} FN_i + 0.5\right)}$$

where c (typically c=40 as described herein) equals the number of partitions, and $TP_i$, $TN_i$, $FP_i$, and $FN_i$ represent the number of true positive, true negative, false positive, and false negative occurrences in the test cases of the $i^{th}$ partition, respectively.

A "classification error" as used herein refers to any error resulting a data point being misclassified. For example, classification errors include classifying an in-class data point as not-in-class (i.e., a false negative) and a not-in-class data point as in-class (i.e., a false positive).

The term "biological state" refers to a condition associated with a biological sample. In some instances, a biological state can refer to one of two different conditions (e.g., a normal or disease condition or a non-toxic or toxic condition) or one of a number of different conditions (e.g., one of various disease conditions associated with different tumor types). A biological state can refer to an "inherent" condition associated with a biological sample or a condition in which the biological sample is exposed to a stimulus.

The term "biological activity" or "bioactivity" refers to the ability of a stimulus to affect a biological sample. For example, a biological activity can refer to the ability of a compound to modulate the effect of an enzyme, block a receptor, stimulate a receptor, modulate the expression level of one or more genes, or a combination thereof. In some instances, a biological activity can refer to the ability of a stimulus to produce a toxic effect in a biological sample. Stimuli have a similar or identical biological activity when they produce a similar or identical effect in a biological sample in vivo or in vitro. For example, fenofibrate, clofibrate, and gemfibrozil have similar biological activities, and all three compounds are prescribed for hyperlipoproteinemia. Similarly, aspirin, ibuprofen, and naproxen have similar biological activities as all three are known to be non-steroidal anti-inflammatory compounds.

The term "gene expression dataset" refers to data that indicate expression levels of a set of genes. A gene expression dataset can be associated with a particular biological activity or a particular biological state. In some instances, a gene expression dataset can indicate one or more genes that are affected by a stimulus. For example, a gene expression dataset can indicate that a specific subset of genes of a genome is modulated by exposure to a compound, or other perturbation to the organism. A "reference" gene expression dataset may include gene expression data obtained under known and controlled conditions of a biological state or activity. The reference dataset may then be used to classify and thereby determine the biological state or activity of "test" gene expression dataset for which the particular biological state or activity of interest is unknown.

III. General Methods of the Invention

A. Construction of Gene Expression Datasets

The present invention may be used to generate classifiers useful for analyzing gene expression datasets obtained from biological samples. A typical biological sample includes a eukaryotic cell, such as, for example, a mammalian cell. Eukaryotic cells can be tested in vivo or in vitro. In some instances, it is desirable to examine eukaryotic cells obtained from various tissue types, such as, for example, liver, kidney, bone marrow, spleen, and the like. In one preferred embodiment the biological samples are tissues from compound-treated animals. A detailed description of the construction and use of such an in vivo chemogenomic dataset is described in U.S. patent publication 2005/0060102, published Mar. 17, 2005, which is hereby incorporated by reference for all purposes.

Each biological sample of a set of biological samples can be exposed to a particular stimulus, and gene expression levels of a set of genes can be measured to obtain a gene expression dataset associated with the stimulus. A gene expression dataset can indicate that one or more gene expression levels are modulated by a stimulus. Gene expression levels can be expressed quantitatively, qualitatively, or both. For example, a gene expression level can be expressed quantitatively based on the amount of mRNA produced or qualitatively based on whether the gene expression level is up-regulated or down-regulated. Gene expression levels can be subjected to one or more manipulations, including, for example, data normalization based on comparing data from different regions of an array to adjust for any systematic errors. Gene expression levels can be expressed in either absolute or relative terms. In some instances, gene expression levels are expressed in the form of a ratio or a logarithm of a ratio. For example, a gene expression level may be expressed as a ratio of an expression level of a gene in response to a stimulus relative to a threshold or baseline expression level of the gene. The threshold or baseline expression level can be, for example, an expression level of the gene absent the stimulus, a historical expression level of the gene, a pooled or averaged expression level of a number of genes, and the like. As another example, a gene expression level may be expressed relative to a "dynamic range" of a gene (e.g., a maximum range of variation of the gene observed historically).

A biological sample can be exposed to a stimulus under particular experimental conditions and can be examined at various time points. Examples of experimental conditions include time, temperature, subject animal species, subject animal gender, subject animal age, other treatment of subject animal (e.g., environmental stresses, prior or concurrent administration of other compounds, and time and manner of sacrifice), tissue or cell line from which gene expression data is derived, type of array and serial number, date of experiment, researcher who performed experiment, client for whom experiment was performed, and the like.

For certain applications, it is desirable to analyze the effects of various stimuli concurrently, particularly where the stimuli are related by biological activity or therapeutic effect. For example, a biological sample can be exposed to a set of stimuli (e.g., a set of compounds), and gene expression levels of a set of genes can be measured to obtain a gene expression dataset associated with the set of stimuli.

In some instances, gene expression datasets obtained from a set of biological samples can indicate gene expression intervals of a set of genes. A gene expression interval can indicate a range of variation of an expression level of a gene, such as, for example, a range of variation of an expression level of the gene in response to a stimulus. Various statistical measures can be used to characterize gene expression intervals, including, for example, standard deviations, interquartile ranges, and the like. A gene expression interval can be associated with multiple measurements of an expression level of a gene or any other experimental uncertainty. Multiple measurements of a gene expression level may be made under the same or different experimental conditions. Also, multiple measurements of a gene expression level may be made using one or more biological samples. For example, multiple measurements of an expression level of a gene may be made using mammalian cells obtained from different tissue types.

B. Matrix Representation of Gene Expression Datasets

Gene expression data, whether obtained from array experiments or otherwise, can be represented in the form of a set of gene expression matrices or tables. In some instances, gene expression datasets obtained from a set of biological samples can be used to form a set of two-dimensional gene expression matrices. Each row of a gene expression matrix can be associated with a particular gene, and each column of the gene expression matrix can be associated with a particular set of measurements. Alternatively, each row of a gene expression matrix can be associated with a particular set of measurements, and each column of the gene expression matrix can be associated with a particular gene.

An example of a set of two gene expression matrices, according to an embodiment of the invention includes a matrix X and a matrix $\Sigma$.

The matrix X corresponds to an n×N matrix of gene expression levels and can be referred to as a "gene expression level matrix." In the illustrated embodiment, each row of the matrix X is associated with a particular gene of a set of genes (i.e., gene 1 through gene n), and each column of the matrix X is associated with a set of measurements for a particular compound of a set of compounds (i.e., compound 1 through compound N). The matrix X includes various data values organized with respect to the n rows and N columns. In the illustrated embodiment, each data value included in the matrix X indicates a typical expression level of a particular gene in response to exposure to a particular compound.

The matrix $\Sigma$ corresponds to a n×N matrix of gene expression intervals and can be referred to as a "gene expression interval matrix." As discussed for the matrix X, each row of the matrix $\Sigma$ is associated with a particular gene of a set of genes (i.e., gene 1 through gene n), and each column of the matrix $\Sigma$ is associated with a set of measurements for a particular compound of a set of compounds (i.e., compound 1 through compound N). The matrix $\Sigma$ includes various data values organized with respect to the n rows and N columns. In the illustrated embodiment, each data value included in the matrix $\Sigma$ indicates a range of variation of an expression level of a particular gene in response to exposure to a particular compound.

In the illustrated embodiment, the set of compounds can include different classes of compounds, and the matrices X and $\Sigma$ can include various sub-matrices associated with the different classes of compounds. For example, a first class of compounds (e.g., class+) can include $N_+$ compounds (e.g., compound 1 through compound $N_+$, where $N_+ < N$), and a second class of compounds (e.g., class−) can include $N_-$ compounds (e.g., compound $N_+ +1$ through compound N, where $N=N_+ +N_-$). Class+ can include compounds that share a particular biological activity, while class− can include compounds that do not share that biological activity or that can share a different biological activity. For example, class+ can include various compounds that share a primary biological activity, while class− can include various compounds that do not share that primary biological activity. The number of compounds included in class+ may be based on the number of related compounds available and is typically at least 2 (e.g., between 2 and 200, such as between 2 and 100, between 2 and 50, or between 10 and 200). Similarly, the number of compounds included in class− is typically at least 2 (e.g., between 2 and 200, such as between 2 and 100, between 2 and 50, or between 10 and 200). In some instances, class+ may include a smaller number of compounds than class−. For example, class+ can include various compounds that share a particular biological activity, while class− can include various remaining compounds of the set of compounds (e.g., all remaining compounds of the set of compounds).

When analyzing gene expression data obtained from measurements for a number of genes (e.g., several hundred or more genes), it is sometimes desirable to select genes that exhibit greater changes in gene expression levels. Selection of genes that exhibit greater changes in gene expression levels allows the number of dimensions n to be reduced and improves computational efficiency and ease of interpretation of results. For typical stimuli, a small number of genes may respond to a high degree (e.g., an increase or decrease in gene expression level by a factor of five or more), and between approximately 100 and 500 genes may exhibit a lesser but still detectable response. Many genes typically do not significantly respond and can often be excluded from further analysis without substantial loss of information. Methods for reducing large datasets based on gene impact is described in U.S. Ser. No. 11/114,998, filed Apr. 25, 2005, which is hereby incorporated by reference herein for all purposes.

C. Derivation of Classifiers (i.e., Signatures) from Datasets

In the general method of the present invention, classification rules may be mined from a large multidimensional (i.e., multivariate) dataset comprising gene expression data by first labeling the full dataset according to known classifications and then applying an algorithm to the full dataset that produces a linear classifier for each particular classification question. Each signature so generated is then cross-validated using a standard split sample procedure.

The initial questions used to classify (i.e., the classification questions) a large multivariate dataset may be of any type susceptible to yielding a yes or no answer. The general form of such questions is: "Is the unknown a member of the class or does it belong with everything else outside the class?" For example, in the area of chemogenomic datasets, classification questions may include "mode-of-action" questions such as "All treatments with drugs belonging to a particular structural class versus the rest of the treatments" or pathology questions such as "All treatments resulting in a measurable pathology versus all other treatments." In the specific case of a chemogenomic dataset based on gene expression, it is preferred that the classification questions are further categorized based on the tissue source of the gene expression data. Similarly, it may be helpful to subdivide the dataset so that specific classification questions are limited to particular subsets of data (e.g. data obtained at a certain time or dose of test compound). Typically, the significance of subdividing data within large datasets becomes apparent upon initial attempts to classify the complete dataset.

Labels are assigned to each individual (e.g., each compound treatment) in the dataset according to a rigorous rule-based system. The +1 label indicates that a treatment falls in the class of interest, while a −1 label indicates that the variable is outside the class. Information used in assigning labels to the various individuals to classify may include annotations from the literature related to the dataset (e.g., known information regarding the compounds used in the treatment), or experimental measurements on the exact same animals (e.g., results of clinical chemistry or histopathology assays performed on the same animal).

More specifically, in the method of the present invention, a classification rule for gene expression data may be derived in accordance with a setup as follows: n represents the number of genes for which measurements are made, N represents the number of compounds, X represents a n×N gene expression level matrix (e.g., the matrix X), $\Sigma$ represents a n×N gene expression interval matrix (e.g., the matrix $\Sigma$), $\rho \geq 0$, and $y \in R^N$. The parameter $\rho$ represents a parameter (e.g., a global parameter) that sets ranges of variation of gene expression levels, and, in some instances, the parameter $\rho$ can be set as 1. The N compounds include $N_+$ compounds included in class+ and $N_-$ compounds included in class−. In the present setup, the $N_+$ compounds include compounds that share a known or predicted biological activity associated with class+, and the $N_-$ compounds include compounds that do not share that biological activity. The vector y represents a labeling vector with N components. The components of the labeling vector y serve as indicators of classes of compounds to which the N compounds belong. Depending on the particular application, the components of y can take on values of 0 and 1 (or ±1) for class+ and class−, respectively. Thus, for example, an $i^{th}$ component of y can take on a value of 0 or 1 depending on whether an $i^{th}$ compound belongs to class+ or class−.

In accordance with this setup, X, Σ, and ρ form an interval matrix model for a n×N matrix Z via a hyper-rectangle in the space of n×N matrices:

$$\chi(\rho) = \{Z \in R^{n \times N} : X - \rho\Sigma \leq Z \leq X + \rho\Sigma\}, \quad (1)$$

where inequalities are understood to be component wise. Using the interval matrix model, a linear classification rule can be derived. In particular, the gene expression data included in the interval matrix model can be used as a training set to derive the linear classification rule. Once derived, the linear classification rule can be used to assign a compound having an unknown biological activity to class+ or class−. Based on such assignment, a biological activity of the compound can be predicted.

A linear classification rule is typically associated with a linear classification function given by: $w^T x + b$, where $w \in R^n$, $x \in R^n$, b is a scalar, and $w^T x$ represents a scalar dot product between w and x (i.e., $w_1 x_1 + w_2 x_2 + \ldots + w_n x_n$). Here, x represents a multi-dimensional data vector to be classified, w represents a classifier vector, and w and b collectively include a set of classifiers of the linear classification function. The multi-dimensional data vector x can correspond to a set of gene expression levels in response to a compound and can be classified to a particular category based on the sign, magnitude, or both, of the linear classification function. For example, once the classifiers are derived in accordance with the methodology described herein, the compound can be assigned to class+ or class− based on the sign of the linear classification function. As a result of its linearity, a linear classification function can facilitate interpretation of results by, for example, allowing identification of a subset of genes that may play a greater role in a biological activity or a biological state. In particular, the n components of the classifier vector w can represent weights associated with respective genes of the n genes, and the subset of genes can be identified based on relative magnitudes of the n components.

A linear classification function can be further understood with reference to gene expression data plotted in a multi-dimensional space, according to an embodiment of the invention. The gene expression data can be used as a training set to derive a linear classification function. It should be recognized that the multi-dimensional space, in general, can include n dimensions. Gene expression datasets associated with compounds in class+ and class− are plotted in the multi-dimensional space. In the illustrated embodiment, compounds belonging to each class of compounds can share a biological activity and can produce similar gene expression responses. Thus, gene expression datasets associated with compounds in class+ and class− tend to cluster at respective regions in the multi-dimensional space. Typical gene expression levels in response to various compounds in class+ (e.g., as specified by the matrix X) can be represented by open circles, while typical gene expression levels in response to various compounds in class− (e.g., as specified by the matrix X) can be represented by solid circles. Ranges of variation of gene expression levels in response to the various compounds (e.g., as specified by the matrix Σ and ρ) can be represented by rectangular boxes surrounding the open and solid circles. In the illustrated embodiment, the sides of a box can have the same length or different lengths, depending on whether gene expression intervals along the two dimensions are the same or different.

Various linear classification functions corresponding to different classifiers are represented as lines in the multi-dimensional space. However, it should be recognized that the linear classification functions, in general, can be represented as hyperplanes. The linear classification functions separate the two clusters of gene expression datasets with varying degrees of performance. Some linear classification functions adequately separate the two clusters of gene expression datasets even if gene expression levels take on different values within respective ranges of variation. On the other hand, some linear classification functions may improperly classify a set of gene expression levels as being associated with class+ (i.e., in-class) if gene expression levels take on certain values within respective ranges of variation.

D. The "Adjusted" SPLP Methodology

The SPLP methodology results in a sparse linear classifier by minimizing an objective function with respect to a training dataset. The details of the SPLP (SParse Linear Programming) methodology for deriving sparse linear classifiers is described in detail in WO 2005/0178807 A2, which is hereby incorporated by reference herein. Briefly, provided with a training dataset of N labeled data points of the form $\{(x_i, y_i)\}_{i=1}^n$ with $x_i \in R^m$ and $y_i \in \{-1, +1\}$, and a linear classification function of the form $f(x) = w^T \cdot x + b$ (with $w \in R^m$; $b \in R$), SPLP generates a sparse linear classifier by minimizing the classification error $$\sum_{i=1}^n \xi_i,$$

while maximizing the sparsity of w, by minimizing $$\sum_{j=1}^m \sigma_j |w_j|,$$

where σ is a vector with n non-negative components $\sigma_j$ that are derived based on the matrix Σ, as described in detail in WO 2005/0178807 A2.

More specifically, the SPLP algorithm solves a convex optimization problem of minimizing an objective function as follows:

$$\min_{w,b,\xi} \rho \sum_{j=1}^m \sigma_j |w_j| + \sum_{i=1}^n \xi_i \text{ subject to}$$

$$y_i(w^T \cdot x_i + b) \geq 1 - \xi_i, \quad i = 1, \ldots, n$$

$$\xi_i \geq 0, \quad i = 1, \ldots, n$$

This objective function may be reformulated as follows:

$$\min_{w,b,\xi} \sum_{j=1}^m \sigma_j |w_j| + C \sum_{i=1}^n \xi_i \text{ subject to}$$

$$y_i(w^T \cdot x_i + b) \geq 1 - \xi_i, \quad i = 1, \ldots, n$$

$$\xi_i \geq 0, \quad i = 1, \ldots, n$$

Thus, the loss function component of the objective function corresponding to this SPLP-formulation is:

$$L_{SPLP} = C \sum_{i=1}^{n} \xi_i.$$

For $C=1/\rho$, the problem will be identical to the solution of the previous problem.

For unbalanced data sets, e.g., where there are significantly more data points labeled not-in-class (−1) than data points labeled as in-class (+1), a gain in linear classifier performance and sparsity may be achieved by making a trade-off (i.e., adjustments) between classification errors occurring with in-class versus not-in-class data. A trade-off resulting in improved performance may be determined using the following loss function, which allows differential weighting of classification errors on the in-class versus not-in-class data:

$$L_{A\text{-}SPLP} = C_+ \Sigma_{i \in x_+} \xi_i C_- \Sigma_{i \in x_-} \xi_i.$$

Here, $x_+$ and $x_-$ are the sets of indices corresponding to data points in-class (labeled+1) and not-in-class (labeled−1), respectively. The value of the constant $C_+$ is related to how seriously classification errors on the positive (i.e., in-class) training data points are penalized, the value of the constant $C_-$ similar for the negative (i.e., not-in-class) training data points.

Using the above loss function leads to the following formulation referred to herein as "A-SPLP":

$$\min_{w,b,\xi} \sum_{j=1}^{m} \sigma_j |w_j| + C_+ \sum_{i \in x_+} \xi_i + C_- \sum_{i \in x_-} \xi_i \text{ subject to} \qquad (2)$$

$$y_i(w^T \cdot x_i + b) \geq 1 - \xi_i, \quad i = 1, \ldots, n$$

$$\xi_i \geq 0, \quad i = 1, \ldots, n$$

This A-SPLP formulation directly allows a flexible trade-off between false positive and false negative classification errors, by differentially weighting in-class and not-in-class classification errors, i.e., splitting the loss function and introducing parameters $C_+$ and $C_-$. In comparison, the regular SPLP formulation groups the in-class and not-in-class errors into one loss term (weighted by C), and thus, cannot provide direct, flexible trade-off between false positives and false negatives.

The A-SPLP formulation is a linear programming problem that gives rise to a convex optimization problem. This optimization problem is amenable to efficient solutions using polynomial-time interior-point methods which are well-known in the art (See, e.g., S. P. Boyd and L. Vandenberghe, "Convex Optimization" (Prentice-Hall, 2003); and Y. Nesterov and A. Nemirovsky, "Interior Point Polynomial Methods in Convex Programming: Theory and Applications" (SIAM, Philadelphia, Pa., 1994); the disclosures of which are incorporated herein by reference in their entireties).

Figure 2:
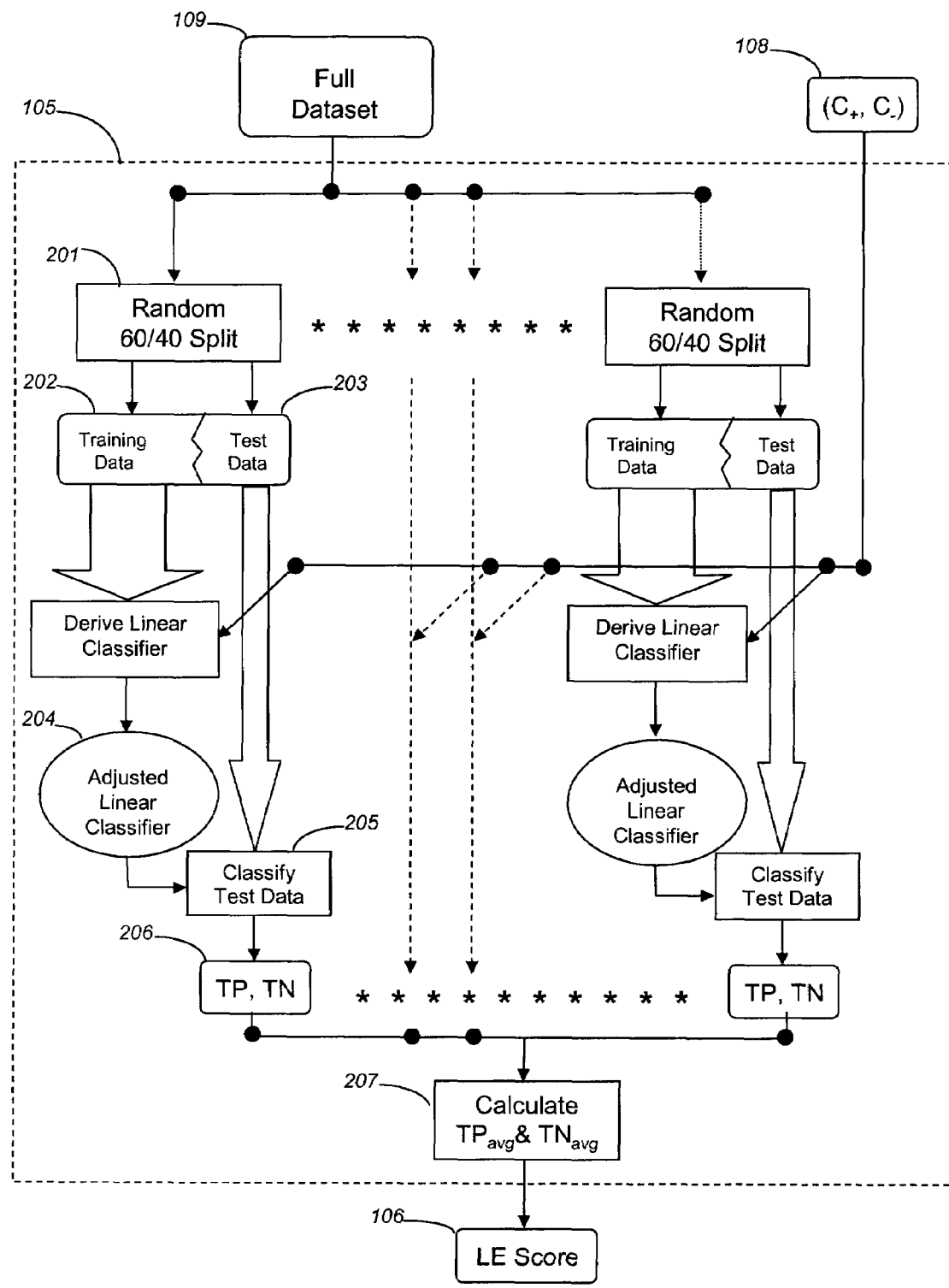
FIG. 2 is a flow chart providing a detailed depiction of the algorithm for evaluating the loss function parameters ($C_+, C_-$) (105) used in the "hill-climbing" algorithm (101).

Proper adjustment of the two loss function parameters, $C_+$ and $C_-$, in order to derive an optimal signature (i.e., linear classifier) may be carried out using a modified "hill-climbing" algorithm (101) as depicted in FIGS. 1 and 2. This modified hill-climbing procedure automatically adjusts the $C_+$ and $C_-$ parameters (108) in an efficient manner so as to provide an optimized LE score (106). The LE score is defined as:

$$LE = -\log(\exp(TP_{goal} - TP) + \exp(TN_{goal} - TN)),$$

wherein, TP and TN are respectively the average true positive and true negative rates (206) for classification of a plurality of test datasets "splits," (205) wherein, for each split, a signature (204) has first been derived by optimizing the objective function on a corresponding training dataset split (202). $TP_{goal}$ and $TN_{goal}$ are user selected "goal" values (e.g., typically 95-98%) for the true positive and true negative rates, respectively.

Although the LE score is not a convex function (i.e., nicely-behaved, bowl-shaped), it behaves roughly convex over a grid of possible ($C_+$, $C_-$) combinations (102), but with some localized noisy behavior. Therefore, the optimization algorithm does a local search, referred to as "hill-climbing." (101) This local search includes inspecting the neighborhood of the current best ($C_+$, $C_-$) combination (104) for a better ($C_+$, $C_-$) combination(108), while also inspecting the neighborhoods of suboptimal ($C_+$, $C_-$) combinations (105) analyzed so far in order to avoid getting stuck in a noisy local maxima (cfr. simulated annealing).

The initial set-up for the modified hill-climbing methodology (101) includes: (1) constructing a grid of $C_+$ and $C_-$ using a logarithmic scale (102); and (2) establishing the boundaries of possible ($C_+$, $C_-$) combinations (103), including the upper and lower bound values for $C_+$, $C_-$, and the $C_+/C_-$, ratio. The search is started with a rather coarse grid. Thereafter, a more refined grid is used to obtain the final result.

The specific steps of the "hill-climbing" procedure include:

1. The current ($C_+$, $C_-$) grid point (104) is "inspected," meaning the eight grid points that are its direct neighbors, and are within the boundaries of the grid (103), are "evaluated" (105) (i.e., the LE score is determined (106));

2. The next grid point that is inspected is the grid point with best LE score that has not yet been inspected, amongst all grid points that have been evaluated so far with an LE score that is at most $\Delta_{ps}$, lower than the current best LE score in the grid (107);

3. In case of ties, i.e., several ($C_+$, $C_-$) combinations that have not yet been inspected have the same, best LE score, the next ($C_+$, $C_-$) combination is chosen to be the one that is the closest (in Manhattan distance) to the current best LE score in the grid (107), and otherwise random.

E. Numerical Implementation of A-SPLP

The A-SPLP methodology may be implemented numerically using conventional convex optimization software packages well-known in the art, for example, MOSEK Optimization Software (MOSEK ApS, Copenhagen, Denmark). In such an approach, A-SPLP (as represented in equation (2) above) may be implemented as a linear programming problem of the form:

$$\min_{w_n, w_p, b, z} \sigma^T(w_p + w_n) + s^T z: \; y_i((w_p - w_n)^T x_i + b) \geq 1 - z_i, i = 1, \ldots, N \qquad (3)$$

$$z_i \geq 0, \; i = 1, \ldots, N$$

$$w_p \geq 0, \; w_n \geq 0,$$

where $w = w_p - w_n$, and $s_i = C_+$ if $i \in x_+$ and $s_i = C_-$ if $i \in x_-$. The vector s provides the different weighting constants for errors corresponding to misclassification of data points in-class or not-in-class. The optimization problem of equation (3) has $2n+N+1$ variables and N constraints (without counting sign constraints on the variables themselves), which can be handled separately by MOSEK Optimization Software.

F. Cross-Validation of Classifiers

Cross-validation of a classifier or signature's performance is an important step for determining whether the performance of the classifier is adequate. Cross-validation may be carried out by first randomly splitting the full dataset (e.g., a 60/40 split). A training classifier is derived from the training set composed of 60% of the samples and used to classify both the training set and the remaining 40% of the data, referred to herein as the test set. In addition, a complete classifier is derived using all the data. The performance of these classifiers may be measured in terms of log odds ratio (LOR) or the error rate (ER) defined as:

$$LOR = \ln(((TP+0.5)*(TN+0.5))/((FP+0.5)*(FN+0.5)))$$

and $$ER = (FP+FN)/N;$$

where TP, TN, FP, FN, and N are true positives, true negatives, false positives, false negatives, and total number of samples to classify, respectively, summed across all the cross validation trials. The performance measures are used to characterize the complete classifier, using the average performance on the training sets and/or the test sets.

The algorithms described above are capable of generating a plurality of different classification rules each with varying degrees of performance for the classification task. In order to identify the classifiers that are to be considered "valid," a threshold performance is selected for the particular classification question. In one preferred embodiment, the classifier threshold performance is set as log odds ratio greater than or equal to 4.00 (i.e. $LOR \geq 4.00$). However, higher or lower thresholds may be used depending on the particular dataset and the desired properties of the signatures that are obtained.

Using the methods described herein, two or more valid classifiers may be generated that are redundant or synonymous for a variety of reasons. Different classification questions (i.e., class definitions) may result in identical classes and therefore identical classifiers. For instance, the following two class definitions define the exact same compounds in a chemogenomic database based on gene expression data: (1) all treatments with molecules structurally related to statins; and (2) all treatments with molecules having an $IC_{50} < 1$ μM for inhibition of the enzyme HMG CoA reductase.

In addition, when a large dataset is queried with the same classification question using different algorithms (or even the same algorithm under slightly different conditions) different, valid classifiers may be obtained. These different classifiers may or may not comprise overlapping sets of variables; however, they each can accurately identify members of the class of interest.

It should be recognized that the embodiments discussed above are provided by way of example, and various other embodiments are contemplated. For example, while certain embodiments have been described in connection with classifying biological gene expression data, it should be recognized that the methodology described herein can be applied to other types of biological data, or to any multi-dimensional dataset.

One of ordinary skill will recognize that the methods of the present invention may be applied to multivariate data in physical science applications such as climate prediction, or oceanography, where large datasets are acquired and linear classification is a useful method of analysis.

Large dataset classification problems also are common in the finance industry (e.g., banks, insurance companies, stock brokers, etc.) A typical finance industry classification question is whether to grant a new insurance policy (or home mortgage) versus not. The variables to consider are any information available on the prospective customer or, in the case of stock, any information on the specific company or even the general state of the market. The finance industry equivalent to a "Group signature" would be financial signatures for a specific decision. The present invention would allow one to generate a classifier for a particular financial analysis question from a large set of financial data.

Also, while certain embodiments have been described in connection with a binary classification rule, it should be recognized that the methodology described herein can also be applied in connection with a multi-class classification rule. In addition, it should be recognized that the methodology described herein can be applied to various other types of loss functions.

As another example, some embodiments of the invention relate to deriving Group Signatures in accordance with the methodology described herein. In some instances, a Group Signature can be derived by sorting classifiers based on magnitude and identifying a subset of genes associated with classifiers having a greater magnitude. Advantageously, the methodology described herein can naturally lead to sparse classifiers, which allow for "short" Group Signatures (e.g., Group Signatures that indicate relatively small subsets of genes). A Group Signature is useful for identifying gene regulatory pathways most affected by a set of stimuli (e.g., a class of compounds) and, by extension, a subset of genes most involved in responding to the set of stimuli. A Group Signature is also useful for characterizing a new stimulus and for predicting a biological activity of the stimulus. In some instances, a database of Group Signatures for various classes of compounds (e.g., a fibrate Group Signature, an ACE inhibitor Group Signature, a caspase inhibitor Group Signature, and the like) can be compiled, where each Group Signature indicates, for example, 10 to 20 genes. The resulting Group Signature database can be substantially smaller than a typical database of gene expression data and can be queried rapidly. Group Signatures can also be derived in accordance with the methods disclosed in the co-pending and co-owned patent application to Natsoulis, entitled "Drug Signatures," U.S. application Ser. No. 10/378,002, filed Feb. 28, 2003, the disclosure of which is incorporated herein by reference in its entirety.

G. Classification Rules Useful for Diagnostic Development

Classification rules (i.e., classifiers or signatures) provided by the methods of the present invention may be used in the development of devices for analytical measurements (e.g., diagnostic devices). For example, a Group Signature comprising a sparse linear classifier made by the methods of the present invention may be "embodied" in a set of analytical reagents (e.g., sequence specific polynucleotide probes, or antigen specific antibodies). These reagents may be immobilized to create a solid phase device (e.g., a polynucleotide array), or used in a solution phase assay (e.g., RT-PCR). For example, one or more solid supports may be provided with various regions, and each region can include polynucleotides capable of specifically binding sequences that make up a particular Group Signature. Thus, a Group Signature chip may have a first region containing probes specific for a fibrate Group Signature; a second region containing probes specific for a phenyl-acetic acid (e.g., aspirin, naproxen, and ibuprofen) Group Signature, and so forth. The probes for each Group Signature can be selected so that they do not overlap or so that they overlap to a minimal degree. Alternatively, if two or more Group Signatures indicate a common set of genes, the chip can be arranged to include probes for the common set as the intersection between two Group Signatures.

Methods of using classifiers for a large multivariate dataset to develop diagnostic devices are described in detail in U.S. Ser. No. 11/114,998, filed Apr. 25, 2005, which is hereby incorporated by reference herein for all purposes.

H Computer-Based Embodiments of the Invention

The methods for classifying multi-dimensional biological datasets provided by the present invention may be embodied in computer-based products such as computer-executable code stored in a computer-readable medium. Any of a wide variety of common computer systems well-known in the art, and typically including one or more computers, may be used to store, retrieve, and analyze the biological dataset information and derive classification rules using the methods and algorithms disclosed herein. Computer systems useful with the present invention may be as simple as a stand-alone computer having a form of data storage (e.g., a computer-readable medium). Alternatively, the computer system can include a network including two or more computers linked together via, for example, a server. The network can include an Intranet, an Internet connection, or both. In some embodiments, the computer systems comprise software processors, software products for receiving and storing user data sets (e.g., gene expression data) or any other multi-dimensional biological data in a database and for executing operations on the stored data. In some embodiments, the software products for deriving and/or optimizing linear classifiers based on the methodologies disclosed herein, are stored in executable form on the same computer system as the database that includes the data set(s) used in the method. Alternatively, the software products of the invention may be stored and executed on a user computer linked to a remote computer system hosting the data set in a database such as Genbank and DrugMatrix (Iconix Pharmaceuticals, Inc., Mountain View, Calif.).

The present invention also provides a computer storage product including a computer-readable medium having computer-executable code thereon, wherein said code comprises instructions for performing various computer-implemented operations used to derive classification rules. Examples of computer-executable code for encoding instructions for the methods of the present invention include machine code, such as produced by a compiler, and files containing higher-level code that are executed by a computer using an interpreter. Source code may be implemented using Java, C++, other object-oriented programming language and development tools, or a higher-level mathematical language such as Matlab® (The Mathworks Inc., Natick, Mass.). For example, the A-SPLP methodology for deriving a classifier, as described by the mathematical framework disclosed herein, may be coded and implemented as an executable program using Matlab® (The Mathworks Inc., Natick, Mass.) by those of ordinary skill in the computer programming arts.

Additional examples of computer-executable code include encrypted code and compressed code. The term "computer-readable medium" is used herein to include any medium that is capable of storing or encoding a sequence of instructions or codes for performing the methods described herein. The media and code may be those specially designed and constructed for the purposes of the invention, or they may be of the kind well known and available to those having ordinary skill in the computer software arts. Examples of computer-readable media include, but are not limited to: magnetic media such as hard disks, floppy disks, and magnetic tape; optical media such as CD-ROMs and holographic devices; magneto-optical media such as floptical disks; carrier waves signals; and hardware devices that are specially configured to store and execute program code, such as application-specific integrated circuits ("ASICs"), programmable logic devices ("PLDs"), read only memories ("ROMs"), random access memories ("RAMs"), erasable programmable read only memories ("EPROMs"), and electrically erasable programmable read only memories ("EEPROMs").

Moreover, some embodiments of the invention may be downloaded as a computer program product, where the program may be transferred from a remote computer (e.g., a server) to a requesting computer (e.g., a client) by way of data signals embodied in a carrier wave or other propagation medium via a communication link (e.g., a modem or network connection). Accordingly, as used herein, a carrier wave can be regarded as a computer-readable medium.

Other embodiments of the invention may be implemented in hardwired circuitry in place of, or in combination with, machine-executable software instructions.

EXAMPLES

The following example is provided as a guide for the practitioner of ordinary skill in the art. The example should not be construed as limiting the invention, as the example merely provides specific methodology useful in understanding and practicing the invention.

Example 1

Construction of Chemogenomic Reference Database (DrugMatrix™)

This example illustrates the construction of a large multivariate chemogenomic dataset based on DNA microarray analysis of rat tissues from over 580 different in vivo compound treatments. This dataset was used to generate 168 non-redundant chemogenomic liver signatures using either the SPLP or A-SPLP methodology as described in Examples 2 and 3.

The detailed description of the construction of this chemogenomic dataset is described in Examples 1 and 2 of Published U.S. Pat. Appl. No. 2005/0060102 A1, published Mar. 17, 2005, which is hereby incorporated by reference for all purposes. Briefly, in vivo short-term repeat dose rat studies were conducted on over 580 test compounds, including marketed and withdrawn drugs, environmental and industrial toxicants, and standard biochemical reagents. Rats (three per group) were dosed daily at either a low or high dose. The low dose was an efficacious dose estimated from the literature and the high dose was an empirically-determined maximum tolerated dose, defined as the dose that causes a 50% decrease in body weight gain relative to controls during the course of the 5 day range finding study. Animals were necropsied on days 0.25, 1, 3, and 5 or 7. Up to 13 tissues (e.g., liver, kidney, heart, bone marrow, blood, spleen, brain, intestine, glandular and nonglandular stomach, lung, muscle, and gonads) were collected for histopathological evaluation and microarray expression profiling on the Amersham CodeLink™ RU1 platform. In addition, a clinical pathology panel consisting of 37 clinical chemistry and hematology parameters was generated from blood samples collected on days 3 and 5.

In order to assure that all of the dataset is of high quality a number of quality metrics and tests are employed. Failure on any test results in rejection of the array and exclusion from the data set. The first tests measure global array parameters: (1) average normalized signal to background, (2) median signal to threshold, (3) fraction of elements with below background signals, and (4) number of empty spots. The second battery of tests examines the array visually for unevenness and agreement of the signals to a tissue specific reference standard formed from a number of historical untreated animal control arrays (correlation coefficient>0.8). Arrays that pass all of these checks are further assessed using principle component analysis versus a dataset containing seven different tissue types; arrays not closely clustering with their appropriate tissue cloud are discarded.

Data collected from the scanner is processed by the Dewarping/Detrending™ normalization technique, which uses a non-linear centralization normalization procedure (see, Zien, A., T. Aigner, R. Zimmer, and T. Lengauer. 2001. Centralization: A new method for the normalization of gene expression data. *Bioinformatics*) adapted specifically for the CodeLink microarray platform. The procedure utilizes detrending and dewarping algorithms to adjust for non-biological trends and non-linear patterns in signal response, leading to significant improvements in array data quality.

$Log_{10}$-ratios are computed for each gene as the difference of the averaged logs of the experimental signals from (usually) three drug-treated animals and the averaged logs of the control signals from (usually) 20 mock vehicle-treated animals. To assign a significance level to each gene expression change, the standard error for the measured change between the experiments and controls is computed. An empirical Bayesian estimate of standard deviation for each measurement is used in calculating the standard error, which is a weighted average of the measurement standard deviation for each experimental condition and a global estimate of measurement standard deviation for each gene determined over thousands of arrays (Carlin, B. P. and T. A. Louis. 2000. *"Bayes and empirical Bayes methods for data analysis,"* Chapman & Hall/CRC, Boca Raton; Gelman, A. 1995. *"Bayesian data analysis,"* Chapman & Hall/CRC, Boca Raton). The standard error is used in a t-test to compute a p-value for the significance of each gene expression change. The coefficient of variation (CV) is defined as the ratio of the standard error to the average $Log_{10}$-ratio, as defined above.

Example 2

Classification of Gene Expression Data Using SPLP

Numerical experiments were performed on data from a chemogenomic gene expression dataset made according to Example 1. The objective of the numerical experiments was to derive sparse classifiers (i.e., classifiers comprising a relatively small number of genes) that were useful for distinguishing three particular classes of compounds from other compounds with good performance. The three compound classes for which classifiers were derived are: fibrates, statins and azoles.

The gene expression data was assembled into a training set based on a matrix X and a matrix $\Sigma$. The matrix X included $log_{10}$ ratios of gene expression levels relative to baseline gene expression levels for n=8565 genes and N=194 compounds. The matrix $\Sigma$ included standard deviations associated with 3 measurements for each compound.

Three different labeling vectors were used corresponding to three particular classes of compounds: (1) the fibrate class of compounds included 36 compounds ($N_+$=36); (2) the statin class of compounds included 31 compounds ($N_+$=31); and (3) the azole class of compounds included 54 compounds ($N_+$=54). Classifiers were derived using a 3:2 ratio of training set to test set. Compounds associated with the test set were used to evaluate average test set error rates (i.e., number of classification errors divided by the number of compounds in the test set) as well as average classifier lengths (i.e., number of non-zero components of classifiers). The average test set error rates and average classifier lengths were obtained using 10-fold cross-validation, and the results were averaged again over the three classification tasks of "fibrates versus other compounds," "statins versus other compounds," and "azoles versus other compounds."

Results were obtained of the numerical experiments for the linear programming based SPLP approach for the three classification tasks as a function of the parameter $\rho$ (labeled as "rho"), where performance is measured based on average test set error rates. The average signature length (number of genes) produced by SPLP may be varied by use of the parameter $\rho$. Overall, the "SPLP" implementation was observed to produce a good compromise in terms of performance, average classifier length, and computational time.

Example 3

Derivation and Optimization of Classifiers Using A-SPLP and SPLP Algorithms

This example describes the use of the A-SPLP methodology, including a modified hill-climbing algorithm, for generating optimal sparse linear classifiers (i.e., signatures) from a chemogenomic dataset. In order to better illustrate the advantages of the A-SPLP methodology, the example also describes the derivation of sparse linear classifiers for the same chemogenomic dataset using the SPLP methodology.

Comparison of Liver Signatures Derived with the A-SPLP and SPLP Algorithms

Using the above-described A-SPLP and SPLP formulations, a total of 168 non-redundant chemogenomic liver signatures were derived and optimized from a chemogenomic dataset prepared as described in Example 1. The average characteristics across all 168 signatures derived using the two algorithms are shown in Table 2.

TABLE 2

Characteristics of 168 Chemogenomic Signatures Derived Using the SPLP and A-SPLP

|  | SPLP | A-SPLP |
| --- | --- | --- |
| Avg. Sensitivity | 46 | 60 |
| Avg. Specificity | 99 | 98 |
| Avg. Length | 59 | 34 |

Sensitivity is calculated using the formula: TP/(TP+FN). Specificity is calculated using the formula: TN/(TN+FP). Length simply refers to the number of genes in the signature.

As shown by the results listed in Table 2, the average sensitivity of the signatures derived using A-SPLP is significantly increased (14%) at the cost of a modest decrease in specificity (1%) relative to the signatures derived using SPLP. The average length of the A-SPLP signatures is also significantly shorter than the SPLP signatures.

The characteristics of two exemplary individual signatures selected from the 168 further illustrate the advantages of the A-SPLP methodology. The two signatures classify compound treatments in the class of: (1) NSAID/Cox-1 inhibitors; and (2) azole antifungals.

As shown in Table 3, the individual performance characteristics of the signatures varied depending on which of the two algorithms were used. Generally, the A-SPLP algorithm resulted in significantly shorter signatures with increased sensitivity but little loss in specificity.

TABLE 3

Comparison of Individual Signatures

|  | NSAID-Cox1 | | | | Azole antifungal | | | |
|---|---|---|---|---|---|---|---|---|
| Algorithm: | SPLP | | A-SPLP | | SPLP | | A-SPLP | |
| Sensitivity | 45.0 | | 74.5 | | 47.3 | | 58.6 | |
| Specificity | 99.6 | | 95.5 | | 99.7 | | 97.6 | |
| Length | 82 | | 21 | | 87 | | 46 | |
| | Probe | Wt. | Probe | Wt. | Probe | Wt. | Probe | Wt. |
| | L18948 | 0.93 | J02635 | 1.15 | D83792 | 1.13 | M10161 | 0.95 |
| | AW141928 | 0.92 | BF420059 | 0.96 | BE105541 | 0.89 | AI169140 | 0.72 |
| | BF282313 | 0.85 | L18948 | 0.90 | AF053317 | 0.77 | AF064706 | 0.66 |
| | AW913986 | 0.82 | AW141928 | 0.85 | BF549324 | 0.72 | D83792 | 0.63 |
| | AW915996 | 0.53 | BE113285 | 0.75 | AI169140 | 0.62 | AW915996 | 0.63 |
| | BF559836 | 0.47 | BF403998 | 0.58 | BF544951 | 0.59 | BE105541 | 0.52 |
| | NM_017235 | 0.44 | AB026291 | 0.51 | AI555237 | 0.54 | BF549324 | 0.51 |
| | BF282961 | 0.42 | NM_021836 | 0.39 | M10161 | 0.53 | NM_019180 | 0.50 |
| | NM_017259 | 0.39 | AI007877 | 0.29 | Z17223 | 0.51 | U07971 | 0.45 |
| | BF403998 | 0.36 | NM_012964 | 0.11 | BF289266 | 0.44 | BF289266 | 0.38 |
| | M34643 | 0.34 | AI137259 | 0.07 | NM_021701 | 0.41 | J00696 | 0.33 |
| | AI176583 | 0.33 | M34643 | 0.05 | BE109604 | 0.41 | AF112256 | 0.33 |
| | J02635 | 0.33 | BE105541 | -0.07 | AA925167 | 0.36 | AB026291 | 0.24 |
| | NM_021842 | 0.31 | M22899 | -0.08 | NM_019180 | 0.36 | AF007818 | 0.23 |
| | NM_017208 | 0.30 | NM_017161 | -0.12 | AF007818 | 0.32 | AF312687 | 0.23 |
| | NM_012528 | 0.30 | BE108830 | -0.23 | AF009329 | 0.32 | BE109271 | 0.21 |
| | NM_012964 | 0.28 | NM_017127 | -0.23 | AW915996 | 0.31 | AB021980 | 0.18 |
| | AI101181 | 0.27 | U46118 | -0.24 | AW525033 | 0.30 | NM_021701 | 0.16 |
| | AF044264 | 0.25 | AI411580 | -0.30 | D11444 | 0.27 | NM_012497 | 0.15 |
| | AF007818 | 0.25 | BE119676 | -0.46 | NM_013137 | 0.25 | BF281787 | 0.12 |
| | AI236754 | 0.24 | BF404316 | -0.62 | U07971 | 0.21 | AI236084 | 0.08 |
| | U37058 | 0.23 | Bias | 0.96 | AI235222 | 0.20 | AB040031 | 0.08 |
| | NM_012633 | 0.23 | | | AF064706 | 0.19 | Z17223 | 0.07 |
| | NM_012551 | 0.20 | | | J00703 | 0.18 | J03190 | 0.05 |
| | AW914342 | 0.15 | | | AI172259 | 0.18 | BF403998 | 0.04 |
| | U53855 | 0.15 | | | AB021980 | 0.17 | AA925167 | 0.04 |
| | BF286916 | 0.13 | | | AF030253 | 0.16 | U69279 | -0.04 |
| | AI412673 | 0.12 | | | AI010950 | 0.16 | NM_012551 | -0.05 |
| | AF160798 | 0.12 | | | BE108830 | 0.15 | AF003598 | -0.06 |
| | AB000113 | 0.12 | | | BF284818 | 0.14 | U71294 | -0.07 |
| | AA848355 | 0.11 | | | J00696 | 0.14 | BE095997 | -0.11 |
| | AF285078 | 0.11 | | | AB026291 | 0.14 | AI231309 | -0.15 |
| | AA925167 | 0.09 | | | BF403998 | 0.12 | NM_013098 | -0.16 |
| | AF203374 | 0.09 | | | AI716265 | 0.12 | X02610 | -0.19 |
| | AI230228 | 0.09 | | | NM_012497 | 0.11 | BF388912 | -0.19 |
| | AW532489 | 0.08 | | | BF413152 | 0.11 | BF283056 | -0.20 |
| | NM_012900 | 0.07 | | | AA893164 | 0.10 | U24174 | -0.21 |
| | AW529672 | 0.06 | | | AI406660 | 0.10 | AI138048 | -0.22 |
| | BE113285 | 0.06 | | | NM_021836 | 0.09 | NM_012842 | -0.25 |
| | NM_019326 | 0.05 | | | AF272158 | 0.09 | BE114586 | -0.30 |
| | BF556327 | 0.04 | | | NM_012530 | 0.09 | NM_019286 | -0.31 |
| | AA998662 | 0.04 | | | BE108246 | 0.08 | AW862656 | -0.37 |
| | NM_012879 | 0.03 | | | AF159103 | 0.08 | AA945149 | -0.43 |
| | BF407531 | -0.03 | | | AI406506 | 0.07 | AI169596 | -0.46 |
| | AI599133 | -0.03 | | | AB032243 | 0.06 | NM_012704 | -0.46 |
| | AW528898 | -0.03 | | | AI236084 | 0.05 | U69278 | -0.49 |
| | AW143907 | -0.05 | | | AI454134 | 0.04 | Bias | 1.18 |
| | BF286009 | -0.05 | | | NM_021747 | 0.03 | | |
| | AI411941 | -0.07 | | | AB032899 | 0.03 | | |
| | AI236696 | -0.08 | | | BF399655 | 0.03 | | |
| | NM_012553 | -0.12 | | | NM_021750 | 0.03 | | |
| | BE105541 | -0.12 | | | AI172165 | 0.03 | | |
| | BF283053 | -0.14 | | | K03249 | -0.03 | | |
| | NM_017161 | -0.15 | | | U87306 | -0.03 | | |
| | AI012250 | -0.15 | | | X13295 | -0.04 | | |
| | AA848821 | -0.18 | | | D29969 | -0.04 | | |
| | AI412189 | -0.18 | | | AI232716 | -0.05 | | |
| | NM_019205 | -0.19 | | | AJ224120 | -0.05 | | |

TABLE 3-continued

Comparison of Individual Signatures

| NSAID-Cox1 | | Azole antifungal | |
|---|---|---|---|
| AB025431 | −0.20 | AA866419 | −0.06 |
| AA819832 | −0.23 | D86345 | −0.08 |
| NM_017139 | −0.27 | BF283056 | −0.08 |
| AI764464 | −0.27 | AW143395 | −0.09 |
| BE103975 | −0.27 | AF015953 | −0.10 |
| AI548615 | −0.29 | BE113624 | −0.13 |
| M64376 | −0.33 | NM_021869 | −0.14 |
| U49235 | −0.34 | AI411141 | −0.15 |
| AF034577 | −0.38 | BF559836 | −0.15 |
| BF563933 | −0.39 | J03637 | −0.16 |
| AW915795 | −0.44 | NM_013098 | −0.16 |
| BF404316 | −0.45 | AA800719 | −0.18 |
| BF411727 | −0.47 | AI598307 | −0.23 |
| D90109 | −0.54 | AW917596 | −0.24 |
| NM_012561 | −0.54 | BE114586 | −0.30 |
| M22899 | −0.56 | D88666 | −0.31 |
| NM_021596 | −0.59 | X02610 | −0.33 |
| AF087696 | −0.61 | AB029559 | −0.37 |
| AB010467 | −0.73 | NM_017084 | −0.39 |
| BF404868 | −0.77 | X02904 | −0.42 |
| AI045288 | −0.85 | BF404868 | −0.46 |
| BE108830 | −0.89 | U38379 | −0.48 |
| U46118 | −0.93 | BE105381 | −0.50 |
| NM_019179 | −1.00 | BF564940 | −0.51 |
| Bias | 1.76 | AI169596 | −0.52 |
| | | U69278 | −0.57 |
| | | NM_012842 | −0.76 |
| | | BF388912 | −0.77 |
| | | AW862656 | −0.85 |
| | | Bias | 1.94 |

Each of the patent applications, patents, publications, and other published documents mentioned or referred to in this specification is herein incorporated by reference in its entirety, to the same extent as if each individual patent application, patent, publication, and other published document was specifically and individually indicated to be incorporated by reference. A practitioner of ordinary skill in the art may also find some helpful guidance by reviewing the attached appendix.

While the invention has been described with reference to the specific embodiments thereof, it should be understood by those skilled in the art that various changes may be made and equivalents may be substituted without departing from the true spirit and scope of the invention as defined by the claims. In addition, many modifications may be made to adapt a particular situation, material, composition of matter, method, process operation or operations, to the spirit and scope of the invention. All such modifications are intended to be within the scope of the claims. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A computer-based method for deriving a linear classifier for gene expression data comprising:
   (a) providing a training dataset comprising two subsets of gene expression measurements, wherein one subset of measurements is labeled in-class and the other subset of measurements is labeled not-in-class;
   (b) providing an objective function, wherein said objective function comprises a 1-norm regularization term and a loss term, wherein said loss term comprises:
      (i) a classification error for each measurement labeled in the class and a weighting constant for the total in-class classification error; and
      (ii) a classification error for each measurement labeled not in the class and a weighting constant for the total not-in-class classification error;
   (c) minimizing said objective function on the training dataset; whereby said minimized objective function provides a linear classifier capable of classifying a dataset of gene expression measurements obtained from a biological sample as in-class or not-in-class.

2. The method of claim 1, wherein the loss term of the objective function has the formula:

$$C_+ \Sigma_{i \in x_+} \xi_i + C_- \Sigma_{i \in x_-} \xi_i,$$

wherein, $\Sigma_{i \in x_+} \xi_i$ is the classification error for measurements labeled in-class and $C_+$ is the total in-class weighting constant, and $\Sigma_{i \in x_-} \xi_i$ is the classification error for measurements labeled not-in-class and $C_-$ is the total not-in-class weighting constant.

3. The method of claim 1, wherein the 1-norm regularization term of the objective function has the formula:

$$\sum_{j=1}^{m} \sigma_j |w_j|$$

wherein $\sigma_j$ is the j-th component of a vector $\sigma$ with n components and $|w_j|$ is the absolute value of the j-th component $w_j$ of the weight vector w with n components.

4. The method of claim 1, wherein minimizing said objective function is performed according to the formulation:

$$\min_{w,b,\xi} \sum_{j=1}^{m} \sigma_j |w_j| + C_+ \sum_{i \in x_+} \xi_i + C_- \sum_{i \in x_-} \xi_i \text{ subject to}$$

$$y_i(w^T \cdot x_i + b) \geq 1 - \xi_i, \quad i = 1, \ldots, n$$

$$\xi_i \geq 0, \quad i = 1, \ldots, n.$$

5. The method of claim 1, wherein the loss term of the objective function has the formula:

$$L_{A\text{-}SPLP} = C_+ \Sigma_{i \in x_+}(\log(1+\exp(w^T \cdot x_i + b)) - y_i(w^T \cdot x_i + b))$$

$$+ C_- \Sigma_{i \in x_-}(\log(1+\exp(w^T \cdot x_i + b)) - y_i(w^T \cdot x_i + b))$$

wherein, $$\Sigma_{i \in x_+}(\log(1+\exp(w^T \cdot x_i + b)) - y_i(w^T \cdot x_i + b))$$

is the error for measurements labeled in-class and $C_+$ is the total in-class weighting constant, and $$\Sigma_{i \in x_-}(\log(1+\exp(w^T \cdot x_i + b)) - y_i(w^T \cdot x_i + b))$$

is the error for measurements labeled not-in-class and $C_-$ is the total not-in-class weighting constant.

6. The method of claim 1, wherein the gene expression measurements in the training dataset comprise gene expression levels measured in response to in vivo compound treatments.

7. The method of claim 1, wherein in-class represents a biological state or a biological activity.

8. The method of claim 1, wherein in-class represents a biological state resulting from a compound treatment.

9. The method of claim 1, wherein in-class represents a structural class of compounds.

10. A computer readable medium, wherein the medium is tangible and selected from magnetic media, optical media, magneto-optical media, or hardware devices, comprising computer-executable code for deriving a linear classifier for gene expression data, said code comprising instructions for:
    (a) accepting input of a training dataset comprising two subsets of gene expression measurements, wherein one subset of measurements is labeled in-class and the other subset of measurements is labeled not-in-class;
    (b) minimizing an objective function on the training dataset, wherein said objective function comprises a 1-norm regularization term and a loss term, wherein said loss term comprises:
        (i) a classification error for each measurement labeled in the class and a weighting constant for the total in-class classification error; and
        (ii) a classification error for each measurement labeled not in the class and a weighting constant for the total not-in-class classification error;
    whereby said minimized objective function provides a linear classifier capable of classifying a dataset of gene expression measurements obtained from a biological sample as in-class or not-in-class.

11. The computer readable medium of claim 10, wherein minimizing said objective function is performed according to the formulation:

$$\min_{w,b,\xi} \sum_{j=1}^{m} \sigma_j |w_j| + C_+ \sum_{i \in x_+} \xi_i + C_- \sum_{i \in x_-} \xi_i \text{ subject to}$$

-continued $$y_i(w^T \cdot x_i + b) \geq 1 - \xi_i, \quad i = 1, \ldots, n$$

$$\xi_i \geq 0, \quad i = 1, \ldots, n.$$

12. The computer readable medium of claim 10, wherein the loss term of the objective function has the formula:

$$L_{A\text{-}SPLP} = C_+ \Sigma_{i \in x_+}(\log(1+\exp(w^T \cdot x_i + b)) - y_i(w^T \cdot x_i + b))$$

$$+ C_- \Sigma_{i \in x_-}(\log(1+\exp(w^T \cdot x_i + b)) - y_i(w^T \cdot x_i + b))$$

wherein, $$\Sigma_{i \in x_+}(\log(1+\exp(w^T \cdot x_i + b)) - y_i(w^T \cdot x_i + b))$$

is the error for measurements labeled in-class and $C_+$ is the total in-class weighting constant, and $$\Sigma_{i \in x_-}(\log(1+\exp(w^T \cdot x_i + b)) + y_i(w^T \cdot x_i + b))$$

is the error for measurements labeled not-in-class and $C_-$ is the total not-in-class weighting constant.

13. The computer readable medium of claim 10, wherein the measurements in the training dataset comprise gene expression levels measured in response to in vivo compound treatments.

14. The computer readable medium of claim 10, wherein in-class represents a biological state or biological activity.

15. The computer readable medium of claim 10, wherein in-class represents a biological state resulting from a compound treatment.

16. The computer readable medium of claim 10, wherein in-class represents a structural class of compounds.

17. A computer-based method for deriving an optimized linear classifier for a set of experimental measurements comprising:
    (a) providing a full dataset comprising two subsets of data points representing experimental measurements, wherein one subset of data points is labeled in-class and the other subset of data points is labeled not-in-class;
    (b) randomly dividing the full dataset into a plurality of splits, wherein each split comprises a training dataset and a test dataset;
    (c) deriving a linear classifier by minimizing an objective function on a training dataset, wherein said objective function comprises a 1-norm regularization term and a loss term, wherein said loss term comprises:
        (i) a classification error for each data point labeled in the class and a weighting constant for the total in-class classification error; and
        (ii) a classification error for each data point labeled not in the class and a weighting constant for the total not-in-class classification error;
    (d) adjusting at least one of the weighting constants, thereby generating an adjusted objective function;
    (e) minimizing the adjusted objective function on the training dataset of each of the plurality of splits, thereby generating a plurality of adjusted linear classifiers;
    (f) for each of the plurality of linear classifiers, determining a true positive rate, TP, and a true negative rate, TN, for classifying the corresponding test dataset of the split;
    (g) determining an LE score, wherein the LE score is defined as:

$$LE = -\log(\exp(TP_{goal} - TP_{avg}) + \exp(TN_{goal} - TN_{avg})),$$

wherein $TP_{goal}$ is a goal true positive rate, $TP_{avg}$ is an average true positive rate for the plurality of adjusted linear classifiers, $TN_{goal}$ is a goal true negative rate and $TN_{avg}$ is an average true negative rate for the plurality of adjusted linear classifiers;

(h) repeating steps (d)-(g) until the LE score can no longer be improved;

(i) minimizing the adjusted objective function that resulted in the best LE score in step (g) on the full dataset, thereby generating an optimized linear classifier capable of classifying a dataset of gene expression measurements obtained from a biological sample as in-class or not-in-class.

18. The method of claim 17, wherein adjusting the weighting constants comprises:
   (a) providing upper and lower boundary values for each of the in-class weighting constant, not-in-class weighting constant, and the ratio of the weighting constants;
   (b) providing a logarithmic-scale grid, wherein each grid point represents a possible combination of in-class and not-in-class weighting constants;
   (c) selecting a grid point;
   (d) determining the LE score of the grid point;
   (e) inspecting the grid point, wherein inspecting comprises evaluating the eight direct neighbor grid points, wherein evaluating comprises determining the LE score;
   (f) selecting the next grid point as the grid point with the best LE score amongst all grid points that have not yet been inspected but have been evaluated, wherein the best LE score is the highest score not more than a set threshold amount lower than the current best LE score in the grid, and in the case of a tie between grid points, selecting the point nearest to the point with the current best LE score in the grid;
   (g) repeating steps (e)-(f) until no next grid point is found with an LE score not more than the set threshold amount lower than the current best LE score in the grid.

19. A computer-readable medium, wherein the medium is tangible and selected from magnetic media, optical media, magneto-optical media, or hardware devices, comprising computer-executable code for deriving an optimized linear classifier for gene expression data, said code comprising instructions for:
   (a) accepting input of a full dataset comprising two subsets of gene expression measurements, wherein one subset of measurements is labeled in-class and the other subset of measurements is labeled not-in-class;
   (b) randomly dividing the full dataset into a plurality of splits, wherein each split comprises a training dataset and a test dataset;
   (c) deriving a linear classifier by minimizing an objective function on a training dataset, wherein said objective function comprises a 1-norm regularization term and a loss term, wherein said loss term comprises:
      (i) a classification error for each data point labeled in the class and a weighting constant for the total in-class classification error; and
      (ii) a classification error for each data point labeled not in the class and a weighting constant for the total not-in-class classification error;
   (d) adjusting at least one of the weighting constants, thereby generating an adjusted objective function;
   (e) minimizing the adjusted objective function on the training dataset of each of the plurality of splits, thereby generating a plurality of linear classifiers;
   (f) for each of the plurality of linear classifiers, determining a true positive rate, TP, and a true negative rate, TN, for classifying the corresponding test dataset of the split;

(g) determining an LE score, wherein the LE score is defined as:

$$LE = -\log(\exp(TP_{goal} - TP_{avg}) + \exp(TN_{goal} - TN_{avg})),$$

wherein $TP_{goal}$ is a goal true positive rate, $TP_{avg}$ is an average true positive rate for the plurality of adjusted linear classifiers, $TN_{goal}$ is a goal true negative rate and $TN_{avg}$ is an average true negative rate for the plurality of linear classifiers;

(h) repeating steps (d)-(g) until the LE score can no longer be improved;

(i) minimizing the adjusted objective function that resulted in the best LE score in step (g) on the full dataset, thereby generating an optimized linear classifier capable of classifying a dataset of gene expression measurements obtained from a biological sample as in-class or not-in-class.

20. The computer readable medium of claim 19, wherein adjusting at least one of the weighting constants comprises:
   (a) providing upper and lower boundary values for each of the in-class weighting constant, not-in-class weighting constant, and the ratio of the weighting constants;
   (b) providing a logarithmic-scale grid, wherein each grid point represents a possible combination of in-class and not-in-class weighting constants;
   (c) selecting a grid point;
   (d) determining the LE score of the grid point;
   (e) inspecting the grid point, wherein inspecting comprises evaluating the eight direct neighbor grid points, wherein evaluating comprises determining the LE score;
   (f) selecting the next grid point as the grid point with the best LE score amongst all grid points that have not yet been inspected but have been evaluated, wherein the best LE score is the highest score not more than a set threshold amount lower than the current best LE score in the grid, and in the case of a tie between grid points, selecting the point nearest to the point with the current best LE score in the grid;
   (g) repeating steps (e)-(f) until no next grid point is found with an LE score not more than the set threshold amount lower than the current best LE score in the grid.

21. The method of claim 17, wherein the loss term of the objective function has the formula:

$$C_+ \Sigma_{i \in x_+} \xi_i + C_- \Sigma_{i \in x_-} \xi_i,$$

wherein, $\Sigma_{i \in x_+} \xi_i$ is the classification error for measurements labeled in-class and $C_+$ is the total in-class weighting constant, and $\Sigma_{i \in x_-} \xi_i$ is the classification error for measurements labeled not-in-class and $C_-$ is the total not-in-class weighting constant.

22. The method of claim 17, wherein the 1-norm regularization term of the objective function has the formula:

$$\sum_{j=1}^{m} \sigma_j |w_j|$$

wherein $\sigma_j$ is the j-th component of a vector $\sigma$ with n components and $|w_j|$ is the absolute value of the j-th component $w_j$ of the weight vector w with n components.

23. The method of claim 17, wherein minimizing the adjusted objective function is performed according to the formulation:

$$\min_{w,b,\xi} \sum_{j=1}^{m} \sigma_j|w_j| + C_+ \sum_{i \in x_+} \xi_i + C_- \sum_{i \in x_-} \xi_i \text{ subject to}$$

$$y_i(w^T \cdot x_i + b) \geq 1 - \xi_i, \quad i = 1, \ldots, n$$

$$\xi_i \geq 0, \quad i = 1, \ldots, n.$$

24. The method of claim 17, wherein the loss term of the objective function has the formula:

$$L_{A\text{-}SPLP} = C_+ \Sigma_{i \in x_+}(\log(1+\exp(w^T x_i + b)) - y_i(w^T x_i + b))$$
$$+ C_- \Sigma_{i \in x_-}(\log(1+\exp(w^T x_i + b)) - y_i(w^T x_i + b))$$

wherein, $$\Sigma_{i \in x_+}(\log(1+\exp(w^T x_i + b)) - y_i(w^T x_i + b))$$

is the error for measurements labeled in-class and $C_+$ is the total in-class weighting constant, and $$\Sigma_{i \in x_-}(\log(1+\exp(w^T x_i + b)) - y_i(w^T x_i + b))$$

is the error for measurements labeled not-in-class and $C_-$ is the total not-in-class weighting constant.

25. The method of claim 17, wherein the gene expression measurements in the training dataset comprise gene expression levels measured in response to in vivo compound treatments.

26. The method of claim 17, wherein in-class represents a biological state or biological activity.

27. The method of claim 17, wherein in-class represents a biological state resulting from a compound treatment.

28. The method of claim 17, wherein in-class represents a structural class of compounds.

29. The computer readable medium of claim 19, wherein minimizing the adjusted objective function is performed according to the formulation:

$$\min_{w,b,\xi} \sum_{j=1}^{m} \sigma_j|w_j| + C_+ \sum_{i \in x_+} \xi_i + C_- \sum_{i \in x_-} \xi_i \text{ subject to}$$

$$y_i(w^T \cdot x_i + b) \geq 1 - \xi_i, \quad i = 1, \ldots, n$$

$$\xi_i \geq 0, \quad i = 1, \ldots, n.$$

30. The computer readable medium of claim 19, wherein the loss term of the objective function has the formula:

$$L_{A\text{-}SPLP} = C_+ \Sigma_{i \in x_+}(\log(1+\exp(w^T x_i + b)) - y_i(w^T x_i + b))$$
$$+ C_{-\Sigma i \in x_-}(\log(1+\exp(w^T x_i + b)) - y_i(w^T x_i + b))$$

wherein, $$\Sigma_{i \in x_+}(\log(1+\exp(w^T x_i + b)) - y_i(w^T x_i + b))$$

is the error for data points labeled in-class and $C_+$ is the total not-in-class weighting constant, and $$\Sigma_{i \in x_-}(\log(1+\exp(w^T x_i + b)) - y_i(w^T x_i + b))$$

is the error for data points labeled not-in-class and $C_-$ is the total not-in-class weighting constant.

31. The computer readable medium of claim 19, wherein the gene expression measurements in the training dataset comprise gene expression levels measured in response to in vivo compound treatments.

32. The computer readable medium of claim 19, wherein in-class represents a biological state or biological activity.

33. The computer readable medium of claim 19, wherein in-class represents a biological state resulting from a compound treatment.

34. The computer readable medium of claim 19, wherein in-class represents a structural class of compounds.

* * * * *